United States Patent [19]

Feldstein

[11] 4,224,178

[45] * Sep. 23, 1980

[54] METHOD FOR REDUCING THE CRYSTALLINITY OF A STABILIZED COLLOIDAL COMPOSITION

[76] Inventor: Nathan Feldstein, 63 Hemlock Cir., Princeton, N.J. 08540

[ * ] Notice: The portion of the term of this patent subsequent to Sep. 13, 1994, has been disclaimed.

[21] Appl. No.: 927,467

[22] Filed: Jul. 24, 1978

Related U.S. Application Data

[63] Continuation-in-part of Ser. No. 758,084, Jan. 7, 1977, abandoned, which is a continuation-in-part of Ser. No. 625,326, Oct. 23, 1975, Pat. No. 4,048,354.

[51] Int. Cl.³ .............................................. B01J 13/00
[52] U.S. Cl. .............................. 252/313 R; 106/1.18; 106/1.23; 106/286.3; 106/286.7; 424/141; 427/304; 427/306
[58] Field of Search .................... 252/313 R; 106/1.18, 106/1.23; 424/141

[56] References Cited

U.S. PATENT DOCUMENTS

| | | | |
|---|---|---|---|
| 2,362,964 | 11/1944 | Affleck | 252/313 R X |
| 2,806,798 | 9/1957 | Weaver | 252/313 R X |
| 2,902,400 | 9/1959 | Moudry et al. | 252/313 R X |
| 2,923,655 | 2/1960 | Vesterman | 424/141 |
| 3,657,003 | 4/1972 | Kenney | 252/313 R X |
| 3,997,452 | 12/1976 | Richardson et al. | 166/274 X |
| 4,048,354 | 9/1977 | Feldstein | 252/313 R X |
| 4,131,699 | 12/1978 | Feldstein | 106/1.11 X |

OTHER PUBLICATIONS

The Merck Index, 8th Edition, 1968, pp. 953, 1012.

*Primary Examiner*—Richard D. Lovering

[57] ABSTRACT

A method for the formation of amorphous dispersions derived by the admixing of a stabilized colloidal dispersion of a higher degree of crystallinity with a modifier. The modified dispersions exhibit a shift towards lower particle size distribution. The resulting amorphous dispersions are useful in a wide variety of chemical processes ranging from catalysis and pigments to display devices.

3 Claims, No Drawings

METHOD FOR REDUCING THE CRYSTALLINITY OF A STABILIZED COLLOIDAL COMPOSITION

REFERENCE TO PRIOR APPLICATION

This application is a continuation-in-part of U.S. application Ser. No. 758,084 filed on Jan. 7, 1977, and now abandoned, which is a continuation-in-part of U.S. application Ser. No. 625,326 filed Oct. 23, 1975, and now U.S. Pat. No. 4,048,354.

BACKGROUND OF THE INVENTION

In the plating of dielectric substrates by chemical (electroless) plating it is well known that suitable catalytic pretreatment is a prerequisite for effective electroless metal deposition. Such practices are well known and accepted in the art.

In examining the prior art for catalytic pretreatment it appears that while different procedures have been used, the incorporation of precious metals (e.g., palladium containing solutions) was common to all procedures. One catalytic system of particular interest is the two step process as disclosed in U.S. Pat. No. 3,011,920. In the process disclosed, a colloidal solution composed of tin(II) and precious metal salts, generally with hydrochloric acid, is used. The effective catalyst is proposed to be a colloid of an elemental precious metal (e.g., palladium) stabilized by the excess stannous chloride present in the medium. While the system disclosed in U.S. Pat. No. 3,011,920 has been quite popular in commercial practices, rising costs of precious metal, instabilities due to air oxidation, and miscellaneous product reliability problems have led to the quest for new systems in which the use of precious metals, tin, as well as hydrochloric acid would be completely eliminated.

In meeting this objective it was found, as described in U.S. Pat. No. 3,958,048, 3,993,799, and 4,087,586 that colloidal systems based upon non-precious metals could constitute the basis for new commercial plating processes. More specifically, it was found and reported that colloidal compositions of non-precious metals (preferably selected from the group of copper, cobalt, iron, nickel and manganese) may be used in the direct replacement of the tin/palladium colloid followed by a treatment (which may be optional) in a suitable reducing (activating) medium. In the latter treatment a precursor derived from the colloidal dispersion constitutes the catalytic sites useful in the initiation of plating. In the reducing medium, reduction of the ionic portion of adduct derived through the adsorption from the colloidal medium takes place or surface activation, resulting in active nucleating sites capable of initiation of the electroless process.

In reviewing the teaching disclosed in the aforementioned issued patents which are included herein by reference, it is recognized that many of the inherent disadvantages associated with the palladium based catlysts are eliminated. It is further recognized that based upon practices in this art it is further essential that any catalytic system should maintain its properties especially with storage (e.g., several months) and shipment under conditions of substantial temperature fluctuation. It is thus highly desirable to have a medium in which good colloidal stability would be maintained, and which at the same time has sufficient catalytic activity to be used in the plating process. I have observed that as one increases stability, activity is decreased thereby making it difficult to meet both requirements in a single preparation step. The activity of the colloid apparently is diminished by the surrounding of the colloid nucleus with the colloid stabilizer(s) used.

For example, I have observed that successful synthesis of active plating colloids has generally shown a limited stability (for long term storage purposes) due to coagulation which takes place leading to precipitation, with, of course, change in particle size and distribution during the coagulation process. In addition, I have noted that highly stable colloidal dispersions have shown limited catalytic activity when used in accordance with U.S. Pat. No. 3,993,799 with a moderate concentration of reducing medium or activating medium or the omission of any secondary step. Similar trends were also noted in U.S. Pat. No. 3,958,048 on the interrelationship between reactivity and stability. In fact, in U.S. Pat. No. 3,958,048 some of the illustrated examples lost their colloidal character and became true solutions within 24 hours.

It is thus highly desirable to provide highly stable colloidal dispersions and at the same time provide a simple way by which the stable colloids may be transformed via a modifier into an active catalytic state (form) useful in electroless plating processes or any other processes utilizing colloids. Furthermore, in said transformation, the metallic portion of the colloid is modified without the apparent change in the formal oxidation state. It is further desirable to obtain dispersions with very fine particle size distributions. Small size dispersions are particularly useful in adsorption processes and catalysis, and in particular tend to exhibit good stability.

While not wishing to be repetitious, the following are included herein by reference: U.S. Pat. No. 3,011,920, 3,993,799, 3,958,048, 3,993,491, 3,993,801, 4,087,586 and 4,048,354.

SUMMARY OF THE INVENTION

A method for reducing the crystallinity of a colloidal composition useful in electroless plating, pigments, and the like, comprising the step of admixing a colloidal dispersion containing colloidal particles having a relatively high degree of crystallinity with a modifier which causes the degree of crystallinity to be reduced. The final admixture is thus comprised of at least two distinct colloid stabilizers. The novel catalytic colloidal compositions may be used in diverse applications such as electroless plating process. In a typical electroless process the steps may comprise the treating of a dielectric substrate with the active catalytic colloidal composition and then, when necessary, the further treatment of the substrate with a reducing or activating composition to provide additional active nuclei on the substrate surface, the activated substrate then being contacted with an electroless plating bath.

DETAILED DESCRIPTION OF THE INVENTION

The process and method of the present invention is applicable to the metallic plating of dielectric substrates by autocatalytic or as more commonly known, electroless plating. Such processes are well known in the art and they produce a wide variety of products varying from printed circuitry arrays, decorative plated plastics parts and magnetic tapes to metallized fibers. It is further recognized that colloidal (sols) dispersions have found a wide variety of utility in applications ranging from catalysis, pigments, electrophotography, additives to glaze, moluscicides, magnetic recordings and display screens (e.g., color TV), to fungicides, coatings (electrophoresis), electroplating, and others.

In some of the above applications the colloids are used after preparation without any further change; however, in others changes may be induced after preparation, e.g., change in the oxidation state of a portion of the colloid. Examples of the latter application are described in Ser. No. 625,326, now U.S. Pat. No. 4,048,354. Regardless of the application under consideration, in general it is highly desirable to utilize dispersions having a small sized particle, high stability, and narrower size distribution. Typical particle size for copper hydroxide (copper hydrous oxides) have generally been reported and sizes of 200 to 1000 Å were reported to represent the state of the art in fine particle size. Such examples may be found in Barker, U.S. Pat. No. 3,635,668 (Jan. 18, 1972) or McFadyan et al, J. Inorg. Nucl. Chemistry, 35, 1883 (1973), McFadyan et al, J. Colloid and Interface Science, 44, 95 (1973), and Matijevic et al, J. Electrochem. Soc., 120, 893 (1973).

Although there are many methods for the preparation of colloidal dispersion, the use of the precipitation (chemical) method has been quite popular. In the latter method, the insoluble phase is developed through the interaction of at least two reactants, e.g., a metal salt with a metal reducing agent, or alternatively, a soluble metal salt with an alkaline agent. Both reactants should preferably be soluble in a suitable solvent. For general survey of preparatory methods see B. Jirgensons and M. E. Straumanis, "A Short Textbook of Colloid Chemistry," 2nd Edition, The MacMillan Company, New York (1962). The present invention would be illustrated through the preparation of colloidal dispersions by precipitation (chemical) method; however, it is clear that the invention is not limited to the preparation method selected.

The method described in this invention may be applied to any of several colloidal compositions which may constitute precious and non-precious metals; the metal may be part of a compound, alloy, or in the metallic state, as well as combinations thereof. Preferred metals are those which are catalytic for electroless metal deposition. Such metals are well known in the art and they are recited in U.S. Pat. Nos. 3,011,920, 3,933,799 and many others.

While the present invention is mainly concerned with dispersions comprising metals and/or metallic compounds, it is noted that in the broad sense the invention is applicable to other dispersions comprising organic compounds as well. For example, the present invention may be equally applicable to the techology described in U.S. Pat. No. 3,697,297.

The term "stabilizer" as used herein is intended to encompass substances which alter the characteristics of the colloid so as to prevent, delay, or minimize their coagulation and precipitation. It is believed that these stabilizers are adsorbed onto the surface of the colloids thereby altering the surface charge and hence their stability. Stabilizers contemplated by the present process and solution may include but are not limited to secondary colloids, protein, gelatin, agar agar, surfactants, sugars and polyalcohols (glycerol), and miscellaneous chemicals derived from wood, e.g., lignin, hemicellulose. It is noted that gelatin is a form of protein.

The term "surfactant" (or surface active agent) as used herein generally refers to substances which are capable of lowering the surface tension of a liquid or the interfacial tension between two liquids. All useful surfactants possess the common feature of a water-soluble (hydrophilic) group attached to an organic (hydrophobic) chain. Surfactants as used herein are also intended to encompass detergents, dispersants and emulsifying agents regardless of whether or not they lower the surface tension of a liquid (e.g., water).

The term "modifier" as used in the present invention refers to chemical compounds which when incorporated to a dispersion (containing a stabilizer(s)) promotes the transformation process of otherwise relatively "crystalline" colloids into a relatively "amorphous" type state and/or changing the particle size distribution towards a distribution state of finer particles derived from a state of coarser particles distribution. The reference to "crystalline" and "amorphous" should be noted to be on a relative basis. It is recognized that the "modifier" is inherently a colloid stabilizer, and thus a colloid stabilizer in one colloidal dispersion may be the modifier in another system, and thus the selection for potential modifier(s) is thus made within materials known more commonly as colloid stabilizers or materials which potentially may be adsorbed onto the colloidal particles. Modifiers may be of organic or inorganic nature as well as combinations thereof. It should be recognized by those skilled in the art that the preferred modifier composition to be added and the quantity thereof is best determined by a trial procedure for each stable colloid composition and/or substrate to be coated. Thus, the selection and application for such potential members is endless and should be obvious to one skilled in the art in view of the present invention.

Furthermore, since no equilibria data is available for the interaction of stabilizer(s) and colloids, the amount of modifier required can not be predicted a priori. However, by simple controlled additions, the required amount can be determined readily. Furthermore, in selecting a potential modifier for a given stabilized system, care must be taken to insure that the phenomenon of precipitation caused by charge reversal does not take place.

Hence, in general it is preferred to select a negative type modifier along with a stabilizer (and conditions used, e.g, pH) which result in a negatively charged colloid and conversely for positively charged colloids. Typical negative and positive modifiers are anionic and cationic surfactants. It is further recognized that certain stabilizers (e.g., protein) have amphoteric properties and they may bear either positive or negative charges depending upon pH condition relative to the isoelectric point. It is further recognized that in the final modified colloidal dispersion at least two stabilizers thus be present.

The following examples are illustrative of the concept of the present invention and are not to be taken as in limitation thereof:

EXAMPLE 1

Stabilized colloid was prepared by the admixing and nucleating of 12.2 g/l $Cu(NO_3)_2.3H_2O$, 12.2 g/l gelatin and sodium hydroxide in an amount representing twice the molar concentration of the copper ion. Prior to the thermal aging pH was adjusted to 9.0 and thereafter aging for about 16 hours was undertaken at about 75° C. to 80° C.

| No. | Final composition |
|---|---|
| 1a | 4 × dilution of the dispersion with water |
| 1b | same as above with 0.025M sodiumlaurylsulfate |

Examination of the dispersions via transmission electron micrographs for dispersions 1a vs. 1b along with the corresponding diffraction patterns has surprisingly revealed the following main characterisics.

Dispersion 1a yields needle like particles with an estimated particle length of 150 to 200 Å. By contrast, dispersion 1b results in some finely divided matter (noted as the grey background) with a particle size of less than 20 Å. It is clearly noted that upon introduction of the modifier, the dispersion has been modified in a manner yielding a higher amorphous nature of the colloidal particles; this change also relates to the change in particle size and distribution.

Using dispersion 1b vs. 1a in the electroless plating process has shown significant difference, i.e., 1b as a much more active product in comparison to the product of 1a.

It has been noted further that the modified dispersions (e.g., 1b vs. 1a) react at a faster rate when a reducing agent (e.g., hydrazine) is introduced to bulk solution.

EXAMPLE 2

A stabilized colloid was prepared by the admixing of 12.2 g/l $Cu(NO_3)_2 \cdot 3H_2O$, 12.2 g/l gelatin and sodium hydroxide in an amount representing twice the molar concentration of the copper ion. Nucleation and aging was carred out at about 85° C. and a total time of about 1.5 hours.

| No. | Final composition |
|---|---|
| 2a | 4 × dilution with water |
| 2b | same as above plus 0.025M sodiumlaurylsulfate |
| 2c | same as 2a plus 12 g/l sodium alpha olefin sulfonate |

Examination of the products via transmission electron micrographs for the corresponding dispersions, 2a, 2b, and 2c, revealed the following major characteristics.

Some of the fine sized particles noted in the electron micrograph of dispersion 2c are estimated to be of the order of 10 Å. Corresponding to the transmission electron micrographs the diffraction patterns were noted. The diffraction patterns noted for 2b and 2c vs. 2a indicate a greater amorphous nature. Again it is noted that the degree of crystallinity is decreased upon the incorporation of the modifier(s) hence increasing the amorphous nature of the modified dispersion. It is interesting to note that visual appearance (to the naked eye) of the colloids in above examples did not reveal any perceptible change.

EXAMPLE 3

A suspension similar to that used in Example 2 was used except the initial pH was lowered (with sulfuric acid) to about pH 3.

| No. | Final composition |
|---|---|
| 3a | 4 × dilution with water |
| 3b | 4 × dilution with water and including 10 g/l of 1-Dodecylpyridinium chloride |

Within about 2 hours significant precipitation was noted in dispersion 3a while none was encountered in 3b. This difference in behavior could only be accounted for by the change of particle size distribution and in particular a change towards small particle distribution which is inherently more stable.

In Examples 4–8 miscellaneous colloidal dispersions were used as modifiers; however, to best illustrate the effect, the resulting product was incorporated into an electroless plating process for the purpose of expediency and cost.

EXAMPLE 4 (JP-70)

A procedure similar to Example 1 (of U.S. Pat. No. 4,048,354) was used. However, a commercial alkaline electroless copper bath comprising formaldehyde was used at room temperature. The weakly active (control JP-39) colloid comprised the admixture with some thermal energy added.

| | |
|---|---|
| $CuSO_4 \cdot 5H_2O$ | 10.0 g/l |
| Gum Arabic | 12.0 g/l |
| $NaBH_4$ | 1.5 g/l |
| NaOH | 1.6 g/l |

Using the control followed by a rinse in 0.5 g/l $NaBH_4$ gave at best 50% metallic coverage. However, incorporating a sodium salt of polymerized alkyl naphthalene sulfonic acids at a concentration of 3.6 g/l to control resulted in 100% coverage.

EXAMPLE 5 (JP-84)

Control colloidal composition and procedure were the same as in example 4. To control 4 ml/l of absolute methanol was added as the reactivity modifier. Plating results after the incorporation of the reactivity modifier were 100% in coverage.

EXAMPLE 6

A control (CB-10) colloidal composition was prepared comprising the admixture of:

| | |
|---|---|
| $CoCl_2 \cdot 6H_2O$ | 2.4 g/l |
| $CuSO_4 \cdot 5H_2O$ | 10.1 g/l |
| Gum Arabic | 12.0 g/l |
| $NaBH_4$ | 1.9 g/l |
| NaOH | 2.0 g/l |

The composition was mixed with added thermal energy.

0.96 g/l of dioctyl sodium sulfosuccinate was incorporated into the control. Using 0.3 g/l of dimethylamine borane (at 45° C. for 3 minutes) showed a significant improvement in the plating results when used in the procedure of Example 4. In this example I found that the combination of copper and cobalt results in a reactivity level superior to either metal alone. Furthermore, I found that the optimum cobalt to copper ratio must be determined for each individual composition; this can be accomplished by simple experiments obvious to those skilled in the art. In addition, while this phenomenon is not completely understood, it is anticipated that nickel and/or iron may be substituted for the cobalt since they are similar in their electronic structure.

In general it was found that an excess of copper to cobalt (or nickel) is preferred.

EXAMPLE 7

A colloidal dispersion of the following admixture at a pH of 12.7 was prepared wherein the reaction was carried out above room temperature.

| | |
|---|---|
| $CuSO_4 \cdot 5H_2O$ | 9.96 g/l |
| $CoCl_2 \cdot 6H_2O$ | 2.38 g/l |
| NaOH | 7.52 g/l |
| $NaBH_4$ | 0.71 g/l |
| Sodium lignosulfonate | 12.0 g/l |

The resulting dispersion was tested in accordance with the procedure of example 6. Results showed no plating. However, using the same composition with acid addition (e.g., sulfuric acid) to a final pH value of about 7.35 resulted in 100% metallic coverage when used in the procedure of Example 4. Accordingly, it should be recognized that pH adjustment(s) and, hence, those chemical additive(s) which are used to achieve said pH adjustment(s) are reactivity modifier(s) and their utilization falls within the spirit of this invention.

EXAMPLE 8

A composition similar to that in Example 7 at a pH of 7.47 with added 0.2 g/l of mercaptobenzothiazole was tested, followed by 0.1 g/l dimethylamine borane (at 45° C.) solution. Whereas the control plated 20% metallic coverage at best, the modified composition gave a plating coverage of 90 to 100% when used in the procedure of Example 4. The above testing was done at a pH of about 7.5. In this example it is noted that a product well known as a corrosion inhibitor was used successfully. This product supports the model proposed.

It is noted that while in most cases the reactivity modifier was added after the colloid was formed, the invention is not limited to this sequence but is rather aimed at the final composition in which all the components including reactivity modifiers are present.

From the above variety of reactivity modifiers used, it should be evident that the invention is not intended to be limited to any specific chemical class, but rather includes all materials which function as either stabilizer and/or adsorbants onto the colloid nuclei.

While I do not wish to be bound by theory, the following model is proposed for possible account of the phenomenon at hand. In the formation of highly stabilized colloid dispersions, the colloidal nuclei (e.g., hydrous oxide of copper) are surrounded by a stabilizer(s) which is adsorbed onto said nuclei. It is probably the degree of adsorption and its consequent charge modifications which contribute to the stabilization mechanism and at the same time makes the colloidal nuclei sterically impervious to the chemical reaction with subsequent reducing agent, or a key component within the electroless plating bath, especially when the latter are used in the moderate reactivity (e.g., concentration of said reducing agent) required for economical plating processes.

Upon the transformation of the weakly active colloids, some removal of stabilizer(s) from the adsorbed layer takes place by a displacement reaction making the colloid nuclei more accessible to subsequent interaction with the reducing medium and hence increasing its reactivity in the plating process. It also appears that in some cases the weakly active colloids are transformed to particles of smaller size.

It should be understood that although the term "colloid stabilizer" refers to various chemical compounds, the effectiveness of stabilizers is not necessarily the same; and thus a stabilizer in one system may be a modifier in another system.

In the formation of crystalline stabilized colloid dispersion, the colloidal nuclei are surrounded by a stabilizer(s) which is adsorbed onto said nuclei. Upon the incorporation of the "modifier" the transformation that takes place by some removal of stabilizer(s) from the adsorbed layer takes place by a displacement reaction and at the same time breaks down the large (clusters) crystalline to smaller particles. This transformation was generally found to be a spontaneous reaction.

Schematically, the following simple equilibria reaction may represent the present findings:

State A　　　　　　　　　　　State E

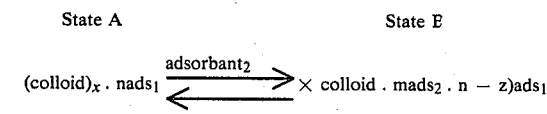

in which ads denotes adsorbant; n, m, z denote some value. Also $ads_1$ and $ads_2$ are chemically distinguishable. In State A a crystalline colloidal dispersion relative to State B is present, or a state of large particle vs. a state of finer particle distribution. As aforesaid, the present invention is not bound to the proposed model and furthermore, in any of the states shown there may be more than one adsorbant (i.e., colloid stabilizer) as well as a multiplicity of colloids, having different metallic nature and/or morphology.

It should be recognized that the present invention is not limited to the nature of the process used but is a method by which extremely fine dispersions may be prepared and in addition there could be more than one modifier present in the final dispersion.

Based upon the present teachings it should be recognized that a new method is available for reducing the particle size distribution of colloidal dispersions. Specifically, the new method may be characterized as reducing the crystallinity or particle size distribution of a stabilized colloidal composition by the admixing of a modifier with said stabilized colloidal composition. The stabilized colloidal composition is prepared by the nucleation of the colloids in the presence of a colloid stabilizer which provides said stabilization and though the modifier is inherently a colloid stabilizer, the two stabilizers are chemically distinct from each other, and moreover the admixing of the modifier and the stabilized colloidal dispersion does not result in change in oxidation state of the metal(s) constituting the colloid nucleus. In a preferred mode, the nucleation of the colloid is carried forth using a secondary colloid as the stabilizer. Also the stabilizer and modifier could be present simultaneously prior to nucleation of the colloid though it is preferable that the latter is introduced subsequent to the colloid nucleation.

What I claim is:

1. A method for reducing the crystallinity of a stabilized colloidal composition by the steps of admixing a modifier with said stabilized colloidal composition and causing the formation of a relatively amorphous colloidal dispersion and further wherein said stabilized colloidal dispersion or otherwise the crystalline colloidal composition is nucleated in the presence of a colloidal stabilizer and wherein the addition of said modifier does not change the oxidation state of any metal(s) constituting the colloid nucleus and wherein said amorphous colloid consists of metals selected from the group consisting of copper, nickel, cobalt and iron and wherein said metal may be part of an alloy, a compound or an elemental state and combinations thereof and wherein said modifier is a surfactant.

2. A method for reducing the crystallinity of a stabilized colloidal composition by the steps of admixing a modifier with said stabilized colloidal composition and causing the formation of a relatively amorphous colloidal dispersion and further wherein said stabilized colloidal dispersion or otherwise the crystalline colloidal composition is nucleated in the presence of a colloidal stabilizer and wherein the addition of said modifier does not change the oxidation state of any metal(s) constituting the colloid nucleus and wherein said modifier is selected from the group of soluble alkylsulfates.

3. A method for reducing the crystallinity of a stabilized colloidal composition by the steps of admixing a modifier with said stabilized colloidal composition and causing the formation of a relatively amorphous colloidal dispersion and further wherein said stabilized colloidal dispersion or otherwise the crystalline colloidal composition is nucleated in the presence of a colloidal stabilizer and wherein the addition of said modifier does not change the oxidation state of any metal(s) constituting the colloid nucleus and wherein said amorphous colloidal dispersion comprises of copper-hydrous oxide, gelatin and sodium laurylsulfate.

* * * * *